United States Patent [19]

Bolante

[11] Patent Number: 5,068,494
[45] Date of Patent: Nov. 26, 1991

[54] CONDUIT CONNECTOR FOR ECCENTRICALLY DIMENSIONED CONDUIT

[75] Inventor: Jay J. Bolante, Chicago, Ill.

[73] Assignee: Appleton Electric Company, Chicago, Ill.

[21] Appl. No.: 545,358

[22] Filed: Jun. 27, 1990

[51] Int. Cl.[5] .............................................. H02G 15/13
[52] U.S. Cl. ................................. 174/65 SS; 285/161; 285/341
[58] Field of Search .......... 439/461; 174/65 R, 65 SS, 174/65 G, 89; 285/249, 161, 162, 331, 332, 341–343, 382.2, 382.7

[56] References Cited

U.S. PATENT DOCUMENTS

| | | | |
|---|---|---|---|
| 2,365,747 | 12/1944 | Cowles | 285/249 |
| 3,784,730 | 1/1974 | Bannies | 174/89 |
| 4,032,177 | 6/1977 | Anderson | 285/249 |

*Primary Examiner*—Neil Abrams
*Attorney, Agent, or Firm*—Jones, Day, Reavis & Pogue

[57] ABSTRACT

A connector for connecting a flexible, eccentrically dimensioned conduit to an electrical fixture comprising a connector cap and body portions. The connector cap has a threaded metal collar portion and a plastic floating sleeve with an extending wedging ring. The mating threaded metal connector body has a deflection ramp and an internally secured plastic sleeve support. The connector body is secured to an electrical fixture and the connector cap is loosely threadably engaged with the connector body. The conduit is inserted through an opening in the connector cap until it abuts the bottom of an annular cavity defined between the connector body upper wall and the sleeve support. The cap is then tightly screwed onto the body such that the wedging ring is cammed, by the deflection ramp, into engagement with the conduit to securely grip the conduit. This arrangement provides a liquid-tight seal. The collar and floating sleeve portions of the connector cap may move laterally and pivotably with respect to one another so that the connector may accommodate eccentrically dimensioned conduit and relieve stress imposed by flexing of the conduit during use. Provision is made in the connector design to minimize twisting of the conduit while engaged by the connector assembly. The wedging ring may also be provided with a depending extension ring for gripping the conduit when the connector cap and body are only joined in a finger-tight manner.

12 Claims, 3 Drawing Sheets

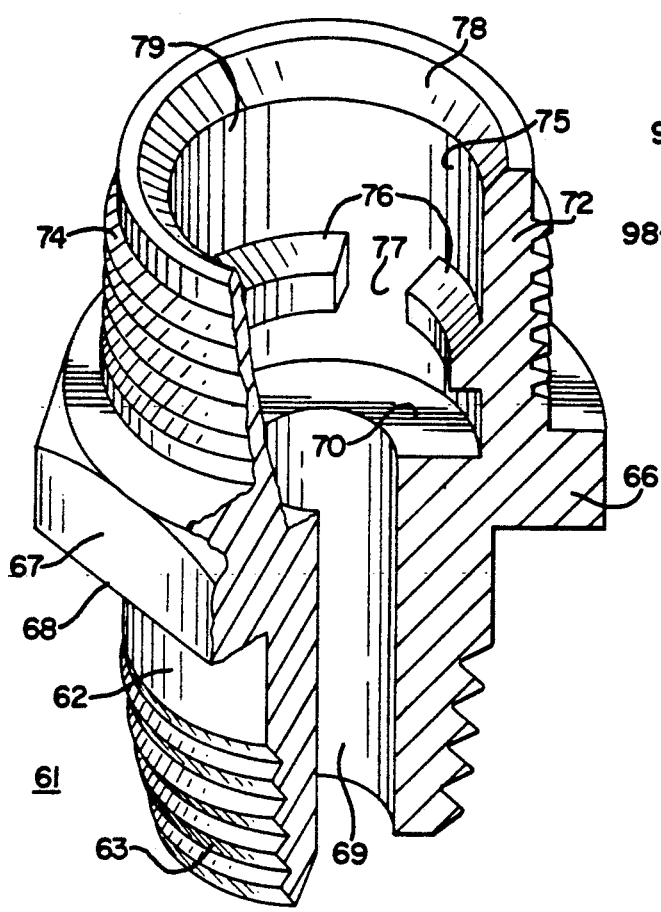
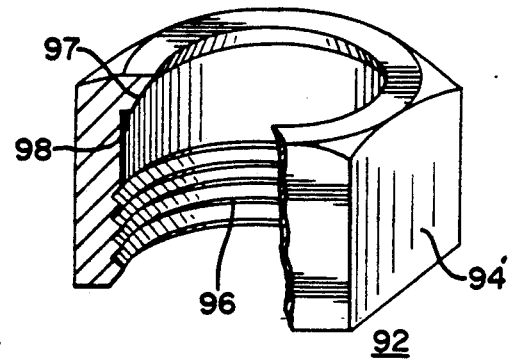
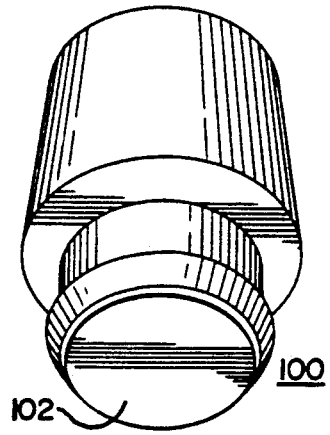
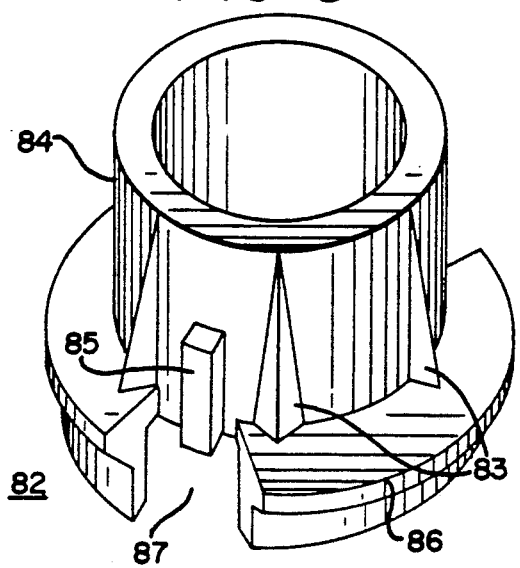
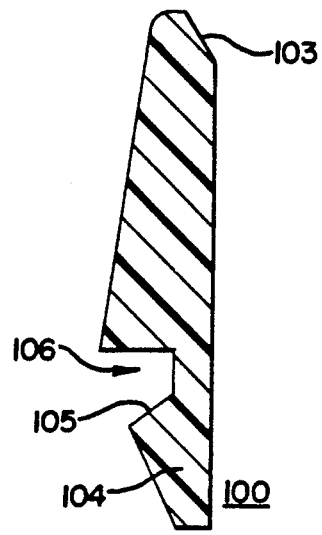

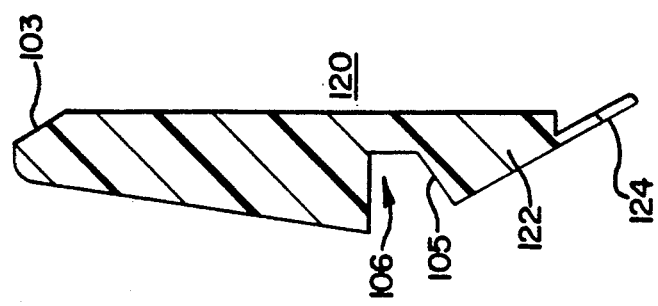
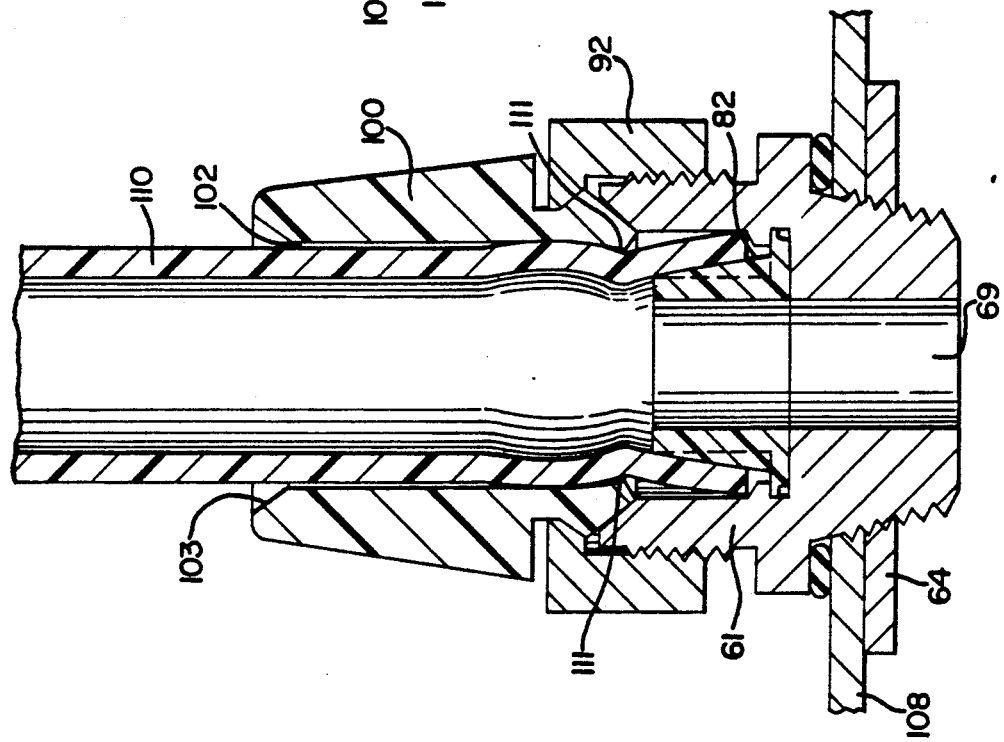
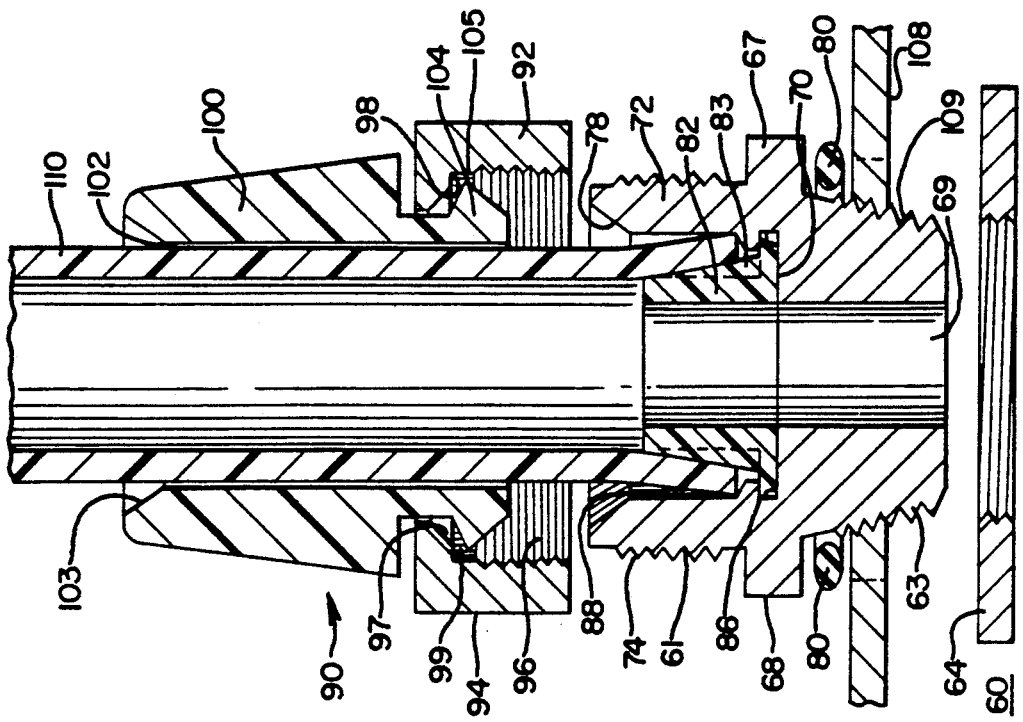

CONDUIT CONNECTOR FOR ECCENTRICALLY DIMENSIONED CONDUIT

BACKGROUND OF THE INVENTION

The present invention relates generally to electrical connectors, and more specifically to liquid-tight conduit connectors which couple liquid-tight, flexible conduits to electrical fixtures, such as junction and outlet boxes.

Liquid-tight, flexible conduits are used to protect electric current-carrying wires. The wires are covered by one or more layers of insulation, such as rubber or plastic resin. The covered wires are then pulled through the longitudinal axial bore of the flexible conduit, thereby being protected.

Such a liquid-tight flexible conduit is employed in environments where the conduit is subject to multiple bends, heavy use, and chemical or liquid spray. There are numerous applications in household, commercial, and industrial building construction for this particular design of conduit hose. Traditionally, liquid-tight flexible conduit is made from helically wound and interlocked metal strips, and the resulting hose is covered by a plastic resin, such as polyvinyl chloride.

A less expensive conduit construction has been made from a unitary layer of plastic material, such as vinyl. Such material is flexible and liquid tight, and has gained great popularity. Typical connectors for this type of plastic conduit include those made by RACO, Thomas & Betts, Crouse & Hinds, and Appleton Electric Company. These connectors generally feature three or more parts, including a matable cap and body portions.

An annular region is defined by the interacting cap and body of the connector. The plastic conduit is actually held by the connector by initially screwing it to part of the connector body before sliding the cylindrically shaped cap over the conduit and screwing it into contact with the body.

A specialty user of plastic conduit is the machine tool industry, especially manufacturers of robotic equipment. Plastic hose might be used, for instance, to protect the wires electrically connecting the hand and body of a robot. Needless to say, such conduit must be flexible, since it constitutes the arm of the moving robot. Because of the particular applications of this type of conduit, it typically is made from multiple layers bonded together to comprise an integral conduit. For instance, there might be an inside layer made from polyvinyl chloride, neoprene, or polyethylene which provides a smooth inside wall with dielectric strength to meet the requirements of the wire passed through the bore of the conduit and coming into contact with this inside layer. The center layer, by contrast, might be made from fiberglass mesh to counteract the elongated resiliency of the other two layers and prevent stretching of the conduit under the stresses of robotic application, while still permitting flexibility. Finally, the outside layer might be made from vinyl to protect the conduit material from attack by, for instance, hydraulic oils, lubricants, chemical solvents, sunlight, ozone, and abrasion.

While connectors conventionally known in the art may be used in conjunction with this specialty category of conduit hose, there are disadvantages. The primary problem is that even the most meticulously manufactured multi-layer conduit generally will be eccentrically dimensioned. That is, part of the conduit wall will be broader at one point of the cross-section of the conduit than at another position. Such eccentrically dimensioned conduit poses problems for conventional connectors which have rigid cap and body walls defining a perfectly dimensioned annular cavity to accommodate the conduit wall. Because of the poor fit between the connector and conduit wall, a proper liquid-tight seal may not be realized. Moreover, the conduit is, in reality, clamped to these sorts of connectors by first screwing the inside wall surface of the conduit into contact with helical threads on a portion of the connector body element. The cap, itself, does not really hold the conduit. This makes assembly and disassembly a cumbersome process. The conduit can also rotate during use while "clamped" by the connector, and this can apply stress to the wires contained therein, which are connected to a stationary electrical source elsewhere. Furthermore, most of the conventional connectors known to those skilled in the art use a relatively high number of parts which, besides being cumbersome to assemble, are made from metal and require machining, thereby substantially increasing the cost of manufacture.

SUMMARY OF THE INVENTION

Accordingly, it is an object of the present invention to provide a conduit connector, which will accommodate eccentrically dimensioned conduit to provide an effective liquid-tight seal.

Another object of the present invention is to provide a connector apparatus which will effectively clamp the conduit wall to resist separation of the two parts during use of the conduit, and which will help to minimize twisting of the conduit with respect to the connector during usage.

A further object of the present invention is to allow the conduit and connector to be assembled and disassembled quickly and easily with a minimum number of mechanical steps and contortions.

Yet another object of the present invention is to provide a conduit connector design which is simple and economical to manufacture without excessive machining requirements.

The connector assembly consists of a metal connector body and a connector cap. Inside the connector body is attached a plastic sleeve support which combines to define an annular cavity. The connector cap, itself, comprises a metal collar to which is attached a plastic floating sleeve. Tapered pipe threads on the body portion secure the connector assembly to an electrical fixture. Another set of threads on the connector body engage a corresponding set of mating threads on the connector cap. A flexible, eccentrically dimensioned plastic conduit is inserted through a bore in the cap and into the annular cavity of the connector body. When the cap is tightly screwed onto the body, the tubular plastic conduit is locked into the connector assembly to form a liquid-tight seal.

To make this connection, the internally threaded cap is loosely screwed onto the connector body, and the conduit is inserted through the bore in the connector cap and is pushed into engagement with the bottom of the annular cavity. The threaded cap is then tightly screwed into engagement with the connector body. As the cap approaches the fully tightened position, a wedging ring on the cap floating sleeve is deformed by a deflection surface on the body into engagement with the outer periphery of the flexible conduit. The wedging ring of the floating sleeve and ribs on the connector body sleeve support grip the conduit to prevent rotation and withdrawal of the conduit. Moreover, the sleeve support may not rotate within the connector body, which prevents conduit twisting as the connector is assembled.

The geometries of the mating surfaces on the collar and floating sleeve portions of the connector cap are such that the two pieces may move laterally and pivotably with respect to one another. This permits the connector assembly to accommodate eccentrically dimensioned conduit and to relieve the stress imposed on the connector by the flexed conduit during connector assembly or conduit use. The wedging ring of the floating sleeve may also have a ring extension depended from its lower edge to grip the conduit when the connector cap and body parts are only assembled in a finger-tight manner.

BRIEF DESCRIPTION OF THE DRAWINGS

FIG. 4 is a partially cutaway isometric view of the connector body of the present invention;

FIG. 5 is an isometric view of the sleeve support;

FIG. 6 is a partially cutaway isometric view of the collar.

FIG. 7 is an isometric view of the floating sleeve;

FIG. 8 is a sectional side view of the floating sleeve shown in FIG. 7;

FIG. 9 is a section view of the connector assembly in its disconnected condition;

FIG. 10 is a section view of the connector assembly in its connected condition; and FIG. 11 is a sectional side view of a second embodiment of the floating sleeve.

DETAILED DESCRIPTION OF THE PREFERRED EMBODIMENT

Figure 1:
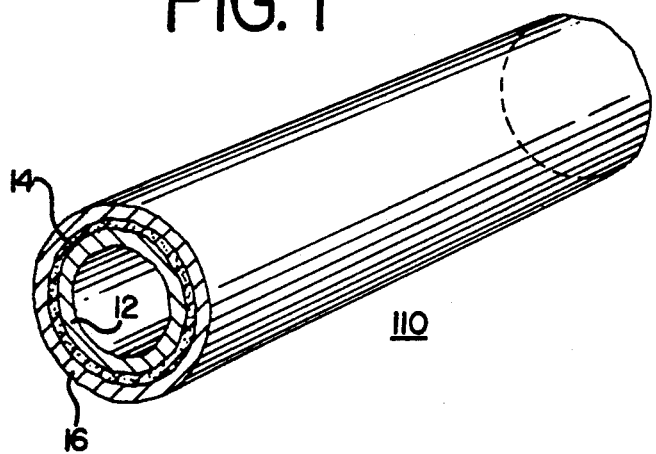
FIG. 1 is an isometric view of the end of an eccentrically dimensioned conduit.

As illustrated in FIG. 1 of the drawings, the type of conduit which is particularly suitable for use with the connector invention does not have uniform wall thickness. While exaggerated somewhat, conduit 10, as depicted in FIG. 1, comprises three bonded layers of different material 12, 14, and 16. For example, inside layer 12 might be made from polyvinyl chloride, neoprene, or polyethylene to provide a smooth surface and dielectric strength for the inside wall of conduit 10. Center layer 14, on the other hand, might be made from fiberglass mesh to prevent elongated stretching of conduit 10, while allowing flexibility at the same time. Finally, outside layer 16 might be made from a material such as vinyl to protect conduit 10 from attack by hydraulic oil, lubricants, chemical solvents, sunlight, ozone, abrasion, etc. As can be seen from FIG. 1, the inside and outside diameters for one or more layers of conduit 10 are not uniform between different positions around the conduit cross section. It is this feature that makes conduit 10 eccentrically dimensioned.

Figure 3:
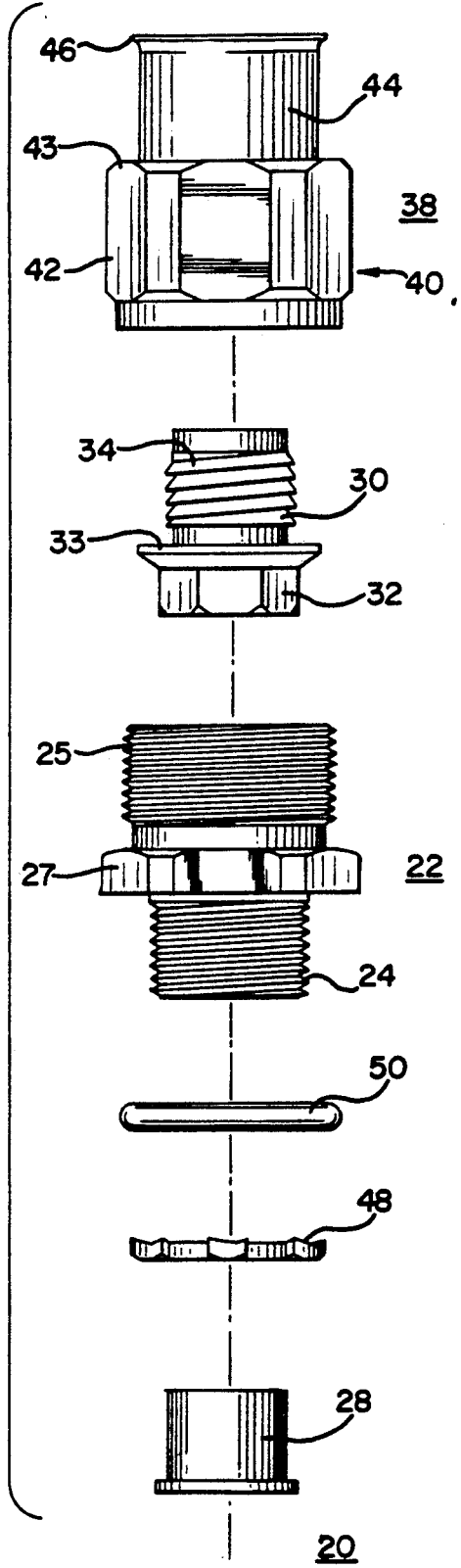
FIG. 3 is an exploded perspective view of the conduit connector shown in FIG. 2.

FIG. 3 illustrates a conventional connector 20 of the prior art, as manufactured by Appleton Electric Company, with an exploded view of the various elements. Connector body 22 consists of a unitary piece of metal with a smooth bore for accommodating the wires of a conduit. The upper portion of the connector body has an octagonally shaped recess machined therein. The outside of the connector is provided with external pipe threads 24 at the lower end, and mating threads 25 at the upper end. Machined onto the center portion of the exterior of connector body 22 is wrench shoulder 27. Finally, bushing 28, made from a plastic material, is fitted into the lower end of the connector body bore to provide a smooth, abrasion-free surface for wires as they exit the connector assembly 20.

Ferrule 30 is made from a plastic material with an octagonal base 32, lip 33, and conduit threads 34. Like connector body 22, it also is provided with a smooth inner bore for receiving wires contained in the conduit.

Figure 2:
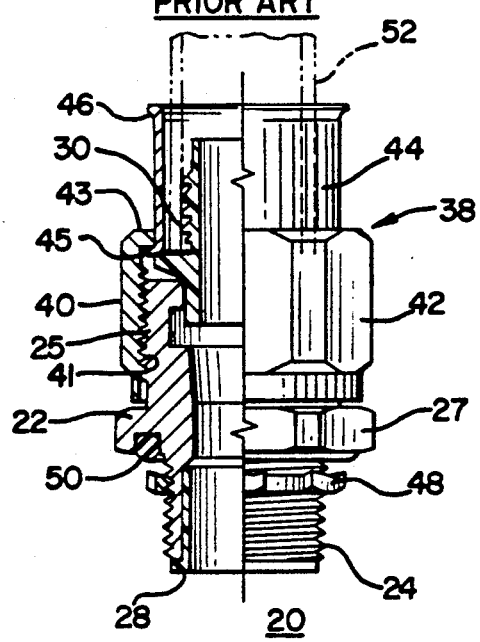
FIG. 2 is a partially cutaway side view of a conduit connector of the prior art.

Connector cap 38 actually comprises two separate parts. The first is a collar which has mating threads 41 machined on its inside surface (see FIG. 2) and an octagonal wrench shoulder 42 on its exterior surface. Flange 43 protrudes innerwards at the top end of the collar. The second element is sleeve 44 which has a smooth inner bore for accommodating the exterior walls of a piece of conduit. The outside surface of sleeve 44 is also smooth, and terminates in outwardly flared lips 45, 46 at both the upper and lower ends. As best seen in FIG. 2, flange 43 of collar 40 and lower lip 45 of sleeve 44 abut to prevent the collar and sleeve from separating completely when they are moved in opposite directions along the longitudinal axis. At the same time, upper lip 46 abuts the top surface of collar 40 when sleeve 44 is almost completely telescoped therein to thwart the sleeve from passing completely through the collar and separating. In this way, at least a portion of sleeve 44 is captivated within collar 40 to make an integral connector cap 38, but the sleeve and collar are free to move along their longitudinal axis with respect to each other.

FIG. 2 illustrates the different parts of the prior art connector 20 in their assembled positions. To connect a piece of conduit 52 to an electrical fixture, such as an outlet box, all of the pieces must be taken apart first. Then the cap assembly is slid around the outside wall of the conduit. Next ferrule 30 is attached to connector body 22 with octagonal base 32 of the ferrule mating with octagonally-shaped recess of connector body 22. Next, the connector-body-ferrule assembly is used as a tool to screw threads 34 of the ferrule into the inside surface of the conduit wall. This holds the conduit to the ferrule. Finally, the connector cap assembly is slid down the exterior surface of the conduit, and mating threads 41 of collar 40 are joined with mating threads 25 of connector body 22 to form the conduit connector. The various parts of connector assembly 20 coincide to provide a continuous bore running the length of the connector for accepting wire passing through it. The connector assembly may be joined with the electrical box either by screwing pipe threads 24 directly into the aperture of the electrical box wall, or else by inserting the lower end of connector body 22 through the hole and threadably engaging locknut 48 from the other side with pipe threads 24. Rubber washer 50 helps to provide a sealed coupling between the electrical fixture and the connector assembly 20.

It is important to appreciate with the prior art conduit coupling described above that the sole means of integral contact between the connector and conduit wall 52 is between threads 34 of ferrule 30 and the inside surface of the conduit wall. Moreover, there is no means for creating a liquid-tight seal between the conduit 52 and connector assembly 20. Instead, any degree of liquid-tight seal arises from the following interacting surfaces of various connector assembly parts: (1) the lower lip of sleeve 44 and the flanged top of collar 40; (2) the bottom surface of sleeve 44 and lip 33 of ferrule 30; and (3) the bottom surface of ferrule 30 and the top surface of connector body 22. When connector body 22 and connector cap 38 are joined in a wrench-tight manner, the various mating surfaces of the connector body, ferrule, and connector cap collar and sleeve will be under pressure. This prevents, to a certain degree, any liquid or moisture that runs down the outside surface of the conduit wall from entering the internal bore of the connector body and coming into contact with the electrical current-carrying wires contained therein. But no liquid-tight seal is created between the exterior conduit wall and the connector assembly, itself.

Moreover, the sleeve 44 of the prior art connector has limited lateral movement with respect to collar 40. Thus, if an eccentric conduit with walls of non-uniform thickness is attached to the ferrule 30, and the sleeve is slid down along the exterior surface of the conduit wall, the collar 40 will not generally meet with connector body 22 so that mating threads 41, 25 of the respective cap and body parts join together. Instead, the material of the conduit walls will generally need to be rearranged under forces exerted by the joinder of the cap and body elements so that the conduit wall is reshaped into a more concentric cross-sectional geometry in order to fit the relatively uniform annualar cavity defined by sleeve 44 and ferrule 30.

Furthermore, conduit 52 often comes from the manufacturer having a slight arc. This causes the conduit to need to be pivoted as the connector cap and body parts are assembled. Also, in the use of the conduit during a particular application, it may be flexed, thereby placing stress on the stationary connector. Because the sleeve 44 of the prior art coupling may not pivot with respect to the collar 40 due to the design, undue stress may be placed on the stationary sleeve. This, in turn, may cause conduit 52 to become separated from the threads 34 on the ferrule 30 and, therefore, from the connector assembly 20, itself. In the prior art connector assembly, sleeve 44 is intended merely to exert downward force on ferrule 30, which in turn is pressed against the connector body 22 to effect a liquid-tight seal between these parts. The sleeve is not designed to pivot with respect to connector collar 40.

The conduit connector of the present invention substantially improves upon connectors known in the prior art by not only providing means to connect a conduit to an electrical fixture in a secure and liquid-tight manner, but also by accommodating eccentrically dimensioned conduit such as that shown in FIG. 1. Referring more particularly to the drawings, FIG. 4 shows the connector body, generally designated 61. The connector body 61 consists of a unitary piece of cast metal, and provides a smooth insulated bore for receiving the wires of a conduit.

The connector body 61 consists of a first portion 62, central portion 66, and second portion 72. The first portion 62 is provided with external tapered pipe threads 63 which engage either a set of mating threads on the electrical fixture or a locknut 64 to create a sealed coupling between the fixture and the connector assembly 60.

The connector body central portion 66 is provided with a wrenching shoulder 67. The wrenching shoulder 67 consists of a series of flat faces 68 arranged around the periphery of the connector body 61 for engagement with a wrenching tool. In the preferred embodiment, eight flat faces are provided; however, this number may vary depending upon the specific design employed. The connector body lower portion 62 and central portion 66 are provided with a centrally located, axially disposed bore 69. The top of central portion 66 defining bore 69 terminates in surface 70.

The connector body second portion 72 (ring wall) is provided with external unified threads 74. These threads are engageable with a set of mating threads 96 formed on the connector cap collar 92, which will be described shortly. Located on the inner surface 75 of the ring wall 72 of the connector body 61 are a series of protrusions 76 extending inwards towards the longitudinal axis of the connector body. Between every two protrusions 76 is a niche 77. The top of the ring wall 72 is provided with a deflection ramp 78. The deflection ramp functions to radially cam a wedging ring located on the connector cap 90 into engagement with the flexible conduit 110, as will be described below. Ring wall 72 and surface 70 combine to define cylindrical cavity 79.

Disposed around the exterior wall of the central portion 66 is a rubber sealing ring 80. When the connector body 61 is threadably engaged with an electrical fixture 108, the sealing ring 80 will contact the fixture, and will compress. The recovery force, provided by the resiliency of the sealing ring 80, will insure that the sealing ring remains in tight contact with the fixture 108.

FIG. 5 illustrates conduit sleeve support 82 made from a plastic material. The sleeve support has a hollow cylindrical upper portion 84 and a flanged lower portion 86. The inside surface of the sleeve support forms part of bore 69.

Located on the outer periphery of sleeve support 82 are a plurality of anti-rotation ribs 83. In the preferred embodiment shown in FIG. 5, the ribs 83 are tapered with respect to the sleeve support 82 so that they circumscribe a larger diameter at the base of the annular cavity 88 than at the mouth of the sleeve support 82. Other designs for the anti-rotation ribs are also possible, such as a plurality of teeth extending upwardly from the lower sleeve flange 86 and arranged at regular intervals around the mouth of the conduit support, and could also be used. The preferred ribs have basically a triangular profile. However, other profiles, such as squares or rectangles, are also contemplated. Also located on the outer periphery of sleeve support 82 are lugs 85 for mating with niches 77 of the connector body 61.

Sleeve support 82 is designed to be inserted inside the cylindrical cavity 79 inside the upper portion of the connector body 61, as defined by ring wall 72. The flanged base fingers 86 of the sleeve support are pushed downwards against protrusions 76 of the connector body. The force will cause the fingers to move upwards, thereby permitting the base of the sleeve support to rest upon surface 70 of cylindrical cavity 79 inside the upper portion of the connector body. The resiliency of the plastic material, though, will cause the fingers to spring back into niche 87. In this way, the sleeve is locked inside connector body 61. Moreover, lugs 85 on sleeve support 82 mate with niches 77 of ring wall 72 to prevent the sleeve support from rotating with respect to the connector body as the connector body and cap are joined. Thus, conduit 110 will not twist. The anti-rotational ribs 83 will generally prevent the conduit from rotating on the sleeve support during connector assembly or conduit use.

An annular cavity 88 is defined by the ring wall 72 of the connector body 61 and the upper wall 84 of sleeve support 82. It should be noted that the sleeve support 82 is designed neither to rotate, nor to be removed from the connector body. This is unlike the ferrule 30 of the prior art connector assembly 20 described above. By using a separate plastic sleeve support, the amount of machining of the metal connector body 61 is substantially reduced during manufacture, for a smooth bore (i.e., the cylindrical cavity 79) may be simply added to the upper portion instead of, e.g., an octagonal recess for accepting the mated bottom protrusion of the ferrule element.

FIG. 6 shows the collar portion 92 of connector cap 90. The collar is provided with a series of flat surfaces 94 arranged about the outer periphery, engageable with a wrenching tool. The collar portion 92 is also provided with internal unified threads 96 which mate with the unified threads 74 of connector body 61. Moreover, collar portion 92 has a flanged lip 97 along its top surface.

The second part of connector cap 90 is floating sleeve 100. It is provided with an internal bore 102 which receives a flexible conduit 110. The bore 102 insulates the liquid-tight seal from the strain caused by radial bending of the conduit, near the juncture of the connector, by dissipating the bending force along the entire length of the bore. The mouth of the bore 102 is beveled 103 (as shown in FIG. 8) to facilitate the insertion of the conduit into the connector cap 90.

Located along the outer surface at the bottom of floating sleeve 100 is wedging ring 104. The wedging ring is coextensive with the internal bore 102 of the floating sleeve, so that it forms an extension of the internal bore 102. Moreover, located on the outside surface of floating sleeve 100 is recess 106.

FIG. 9 shows the connector body 61, plastic sleeve support 82, connector cap collar 92, connector cap floating sleeve 100, locknut 64, rubber sealing ring 80, flexible conduit 110, and electrical fixture 108 in their disassembled state. As can be seen, connector cap 90 consists of collar portion 92 and floating sleeve portion 100, wherein flanged lip 97 of the collar 92 engages with recess 106 of floating sleeve 100. Because floating sleeve 100 is made of plastic, it is flexible enough that wedging ring 104 may be forced past flanged lip 97 of the mouth of collar 92, and it will flex back to its original position, thereby locking the two components together to form an integral connector cap assembly 90. These two parts are not designed to be taken apart by the user. At the same time, there is a certain degree of play between the parts so that floating sleeve 100 may move laterally and even pivotably vis-a-vis collar portion 92 in order to accommodate a conduit of eccentric dimension. The collar 92 and floating sleeve 100 elements of connector cap 90 are allowed to pivot with respect to each other due to the relative geometrics of the two parts. In part, this occurs because of mating conical surface 105 on the floating sleeve (see FIG. 8) and conical recess 98 on the underneath side of flanged lip 97 of collar 92 (see FIG. 6).

To assemble the connector 60, connector body 61 is first attached to a wall of the electrical fixture 108. This can be accomplished either by screwing the tapered threads 63 directly into aperture 109, or by inserting the threads through the aperture 109 and securing the device with locknut 64, as shown in FIGS. 9 and 10. The conduit 110 is then inserted through the connector cap 90 until the bottom edge of the conduit 110 abuts the base 86 of support sleeve 82 in annular cavity 88. It should be noted that the cap 90 need not be completely disconnected from the connector body 61 to perform the assembly operation. This is shown for purposes of illustration only. During actual assembly, the cap need only be loosened such that the wedging ring 104 is not cammed into the path of the conduit 110 by deflection ramp 78.

The connector cap 90 is then screwed tightly down onto the connector body until the device assumes the position of FIG. 10. As the cap 90 is screwed down, the ring wall 72 of the connector body 61 moves into the cavity 99 defined between collar 92 and wedging ring 104 of floating sleeve 100, and the wedging ring 104 comes into contact with and slides along the deflection ramp 78. Because the deflection ramp 78 is angled downwardly and inwardly, relative to connector body 61, the wedging ring 104 is cammed towards the conduit 110 so that the edge of the wedging ring 104 engages the outside wall of plastic conduit 110 as shown at 111 in FIG. 10. Continued tightening of the connector cap 90 causes the wedging ring 104 to drive the conduit toward the connector body 61 to create seal with the base of annular cavity 88. When this occurs, the inside diameter of conduit 110 is forced onto the largest diameter circumscribed by the anti-rotation ribs 83 of sleeve support 82 located at the base of annular cavity 88 to further eliminate any twisting of conduit 110 as the cap 90 is tightly screwed down. As already noted, lugs 85 of sleeve support 82 engage with niches 77 of connector body 61 to prevent the sleeve support (and thus the retained conduit 110) from rotating as the cap is tightened onto the connector body. As the wedging ring 104 compresses inwardly, it causes the portion of the conduit below the wedging ring 104 to bell or flare outwardly so that the outer periphery of the conduit presses against the wall of the upper portion 72 of the connector body 61 to provide an additional seal, shown in FIG. 10. This flared lower conduit wall cannot pass between the leading edge of wedging ring 104 and the leading edge of the top portion 84 of sleeve support 82 when the connector cap and body are assembled, for the distance between these two points is, on average, only two-thirds of the conduit wall thickness when the conduit 110 is in a relaxed state. The force of the wedging ring 104 on the conduit 110 also causes the material of the plastic conduit to spread which expands the thickness of the conduit in the annular cavity 88, hereby insuring a complete seal between the conduit and the connector body 61. In this manner, the conduit 110 is locked into the connector assembly 60 between the wedging ring 104 and the floating sleeve 100 to form a liquid-tight seal.

Thus, the connector assembly of the present invention, unlike devices known in the prior art, holds the flexible conduit securely by physically deforming the wall of the conduit. This will help to prevent separation of the conduit from the connector assembly during use and, it is submitted, will work more effectively towards this end than can be accomplished by the ferrule threads 34 known in the prior art. Moreover, the anti-rotation ribs 83 of the present invention will effectively thwart rotation of the conduit with respect to the stationary connector assembly 60 and electrical fixture 108 during use, which will relieve stress on the wires contained in the conduit 110. Furthermore, the lateral and pivotable movement of the floating sleeve 100 with respect to the connector body 61 not only will readily accommodate varying wall thicknesses of eccentrically dimensioned conduit 110, but also will allow some pivoting of the conduit during use without breaking the liquid-tight seal between the conduit and connector assembly. And finally, unlike the prior art devices, the connector of the present invention effects a liquid-tight seal directly with the conduit, namely, between wedging ring 104 and the external surface of the conduit wall, as well as between the internal surface of the conduit wall and the upper portion 84 of sleeve support 82.

Another advantage of the present invention is its simplicity of use. Conduit may be affixed in the connector assembly more quickly and simply than would be the case with the prior art devices, because there are fewer parts to manipulate. The connector assembly of the present invention is also cheaper to manufacture because of its use of plastic material for some components, as well as less machining of the metal parts.

FIG. 11 shows a second embodiment of the floating sleeve portion 120 of the connector cap. Depending from the wedging ring portion 122 of floating sleeve 120 is ring extension 124. When the cap assembly is joined with connector body 61 substantially as described above, ring extension 124 will jam up the portion of annular cavity 88 which is not filled by conduit wall 110. In this way, the conduit may be retained by the connector assembly 126 when the screw threads of the connector cap and body are joined in only a finger-tight manner, as opposed to the wrench-tight method often applied. This finger-tight mode of connection permits the user to provisionally secure the conduit 110 to an electrical fixture 10 while reaching for a wrench to complete the assembly process.

Although the invention has been described with a certain degree of particularity, it is understood that the present disclosure has been made by way of example only. Numerous changes in details and construction will be apparent without departing from the spirit and scope of the invention.

What is claimed is:

1. A connector assembly for connecting eccentrically dimensioned, liquid-tight flexible electrical conduit to an electrical fixture, comprising:
    (a) a metal connector body including: a first portion formed with a means for connecting said connector body to the electrical fixture; a central portion, the first and central portions having a centrally located, axially extending bore; and a second portion having a ring member formed with a first set of screw threads, the ring member having a deflection ramp formed thereon, and defining a recess inside the second portion of said connector body;
    (b) a plastic sleeve support, having a corner edge on the top outer end thereof and inserted inside the recess of said connector body, and forming an extension of the axially extending bore such that a first annular cavity is formed between the ring member and the sleeve support;
    (c) a connector cap comprising:
        (i) a metal collar formed with a second set of screw threads engagable with the first set of screw threads on the connector body second portion, and a flanged lip extending inwardly along the top surface of said metal collar;
        (ii) a plastic floating sleeve including: an upper tapered portion; a lower portion having a wedging ring having a leading edge at substantially the distal end thereof; and a recess defined along the exterior surface of said floating sleeve between the upper and lower portions, the upper and lower portions having an axially extending, centrally located bore, the wedging ring being coextensive with the bore;
        (iii) the recess of said floating sleeve engaging the flanged lip of the collar to form said connector cap, wherein said floating sleeve can move laterally and pivotably with respect to said collar, and the wedging ring and said collar form a second annular cavity therebetween;
    (d) the bore of said connector cap and the recess of said connector body being adapted to receive a conduit; the second set of screw threads being engagable with the first set of screw threads to join said connector cap to said connector body; the wedging ring being deformed inwardly by the deflection ramp as said connector cap is screwed into engagement with said connector body such that the leading edge of the wedging ring deflects the conduit wall, forming a locking engagement and liquid-tight seal with the exterior surface of the conduit thereat, forcing the conduit into the first annular cavity to form a liquid-tight seal therein, and forming a locking engagement and liquid-tight seal between the corner edge of said sleeve support and the interior surface of the deflected conduit.

2. The connector assembly as recited in claim 1, wherein the distance between the leading edge of the floating sleeve of said connector cap and the corner edge of said sleeve support is less than the width of the conduit wall in its relaxed state so that when said connector body and connector cap are threadably engaged, the conduit wall is gripped between the leading edge of the floating sleeve and the corner edge of said sleeve support.

3. The connector assembly as recited in claim 2, wherein the distance between the leading edge of the floating sleeve and the corner edge of the sleeve support is two-thirds of the width of the conduit wall in its relaxed state.

4. The connector assembly as recited in claim 1, wherein the face of the wedging ring of said floating sleeve defining in part the recess has a conical surface, and the underside of the flanged lip of said collar has a conical recess, whereby the conical surface and the conical recess engage such that said floating sleeve and said collar are pivotable with respect to one another.

5. The connector assembly as recited in claim 1, further comprising an extension ring depending from the wedging ring such that as the second set of screwthreads engage with the first set of screwthreads to join said connector cap to said connector body, the extension ring fills the portion of the first annular cavity not filled by the conduit wall to grip the conduit.

6. The connector assembly as recited in claim 1, wherein a plurality of anti-rotation ribs are arranged on the outer surface of said sleeve support to prevent twisting of the conduit as said connector cap is screwed into engagement with said connector body.

7. The connector assembly as recited in claim 6, wherein the anti-rotation ribs are triangular in profile.

8. The connector assembly as recited in claim 1, further comprising: a plurality of protrusions arranged on the inner surface of the ring member of said connector body inside the recess, every two protrusions having a niche therebetween; and a plurality of lugs arranged on the outer surface of said sleeve support, whereby the lugs engage with the niches to prevent said sleeve support from rotating with respect to said connector body to prevent twisting of the conduit as said connector cap is screwed into engaged with said connector body.

9. The connector assembly as recited in claim 1, wherein the central portion includes a wrenching shoulder comprising a plurality of flat faces arranged about the periphery of said connector body.

10. The connector assembly as recited in claim 1, wherein the central portion includes a separate sealing ring for creating a liquid-tight seal with the electrical fixture.

11. The connector assembly as recited in claim 1, wherein said connector cap floating sleeve has a beveled edge at the mouth of said bore to facilitate the insertion of the conduit into the connector assembly.

12. The connector assembly as recited in claim 1, wherein the connector body is of unitary construction.

* * * * *